United States Patent [19]

Fujiwara

[11] Patent Number: 4,998,445
[45] Date of Patent: Mar. 12, 1991

[54] SYNCHRONIZER RING

[75] Inventor: Hideaki Fujiwara, Toyama, Japan

[73] Assignee: Tanaka Seimitu Kogyo Kabushiki Kaisha, Toyama, Japan

[21] Appl. No.: 430,633

[22] Filed: Nov. 1, 1989

[51] Int. Cl.⁵ .................................. F16H 3/38
[52] U.S. Cl. ........................ 74/339; 192/53 E; 192/53 F
[58] Field of Search ............. 74/339; 192/53 E, 53 F

[56] References Cited

U.S. PATENT DOCUMENTS

| | | | |
|---|---|---|---|
| 3,620,338 | 11/1971 | Tomita et al. | 192/53 F |
| 3,700,083 | 10/1972 | Ashikawa et al. | 192/53 F |
| 4,445,602 | 5/1984 | Chang | 74/339 X |
| 4,660,707 | 4/1987 | Sadanori et al. | 192/53 F |
| 4,732,247 | 3/1988 | Frost | 192/53 F |
| 4,776,228 | 10/1988 | Razzacki et al. | 74/339 |
| 4,828,087 | 5/1989 | Kudo et al. | 74/339 X |
| 4,838,399 | 6/1989 | Inui | 192/53 F |
| 4,842,112 | 6/1989 | Inui | 192/53 F |

FOREIGN PATENT DOCUMENTS 48-24096 7/1973 Japan.

Primary Examiner—Dwight Diehl
Attorney, Agent, or Firm—Flynn, Thiel, Boutell & Tanis

[57] ABSTRACT

A synchronizer ring comprises a boss, three projections disposed on the peripheral surface of the boss at the angular interval of 120°, and a round elastic ring engaged with and supported by the three projections characterized in that, three protrusions are disposed at both sides or one side of the three projections and spaced apart from the projections and adjacent thereto for supporting the round elastic ring, the protrusions having the sectional diameter same as that of the round elastic ring. The protrusions may be integrally formed with and extending from the projections. Four to six projections can be disposed on the peripheral surface of the boss at the angular interval of 90° to 60° and a round elastic ring engaged with and supported by the projections.

7 Claims, 4 Drawing Sheets

SYNCHRONIZER RING

BACKGROUND OF THE INVENTION

1. Field of the Invention

The present invention relates to a synchronizer ring in a synchronizer speed change gear having a round elastic ring.

2. Prior Art

The synchronizer ring of this type is developed by Honda Motor Co., Ltd. (Honda Synchronizer Ring) and is disclosed in Japanese Patent Publication No. 48-24096 and illustrated in FIG. 1. The synchronizer ring 1 includes a boss 2, projections 3, 3, 3 mounted on the surface of the boss 2 for the angular interval of 120° and a round elastic ring 4 disposed over the projections 3, 3, 3.

An operation of the prior synchronizer ring having such arrangement will be described with reference to FIGS. 2A to 2D.

In FIG. 2A, when a sleeve 5 contacts the round elastic ring 4 at the time of shifting operation of the synchronizer ring 1, the round elastic ring 4 serves to absorb an impulse of the movement of the sleeve 5 toward a driven gear 7 and to push the synchronizer ring 1 to a driven gear 7 before a tooth 6 of the sleeve 5 contacts a tooth 8 of the synchronizer ring 1 to preliminarily rotate a driven gear 7.

In FIG. 2B, inasmuch as the tooth 8 of the synchronizer ring 1 prevents the tooth 6 of the sleeve 5 from entering inside the tooth 8 when the sleeve 5 starts to contact the tooth 8 of the synchronizer ring 1, the synchronizer ring 1 is forcibly pushed toward the driven gear 7 to effect the synchronized shifting operation. At this time, the round elastic ring 4 is deflected in maximum.

In FIG. 2C, the tooth 6 of the sleeve 5 passes the tooth 8 of the synchronizer ring 1 and starts to contact a tooth 10 of the driven gear 7 when the synchronized shifting operation is completed. No noise is generated when the tooth 6 contacts the gear 10 since the synchronized shifting operation is already completed so that the tooth 6 of the sleeve 5 smoothly enters inside the gear 10 of the driven gear 7.

It is evident from FIG. 2D that the tooth 6 of the sleeve 5 enters completely inside the tooth 10 of the driven gear 7 so that the driven gear 7 rotates together with the sleeve 5.

The prior art speed change gear employing the round elastic ring has a high performance characteristic irrespective of its simple structure. However, in the case the prior speed change gear is employed in a big truck, the diameter of the round elastic ring 4 becomes more than 90 mm. Inasmuch as the distance between each fulcrum point supporting the round elastic ring 4 becomes excessive in this case, an elastic force is less than a prescribed value even if the deflection strength is applied to the round elastic ring 4 so that the load to be generated is insufficient. That is, there are such problems the synchronizer ring can not achieve the function to absorb an impulse of the movement of the sleeve toward a driven gear and to push the synchronizer ring to a driven gear to preliminarily rotate a driven gear.

There is such a means to solve the problems that the cross section of the round elastic ring 4 (secondary moment of cross section) is enlarged. According to this means, the size and the weight of the round elastic ring 4 becomes excessive within a limited space of the speed change gear so that this means can not be effectively employed.

SUMMARY OF THE INVENTION

The present invention has been made in view of the situation set forth above and to provide a synchronizer ring capable of being employed in a large-sized speed change gear without enlarging the cross section of the round elastic ring.

To achieve the object of the present invention, a first synchronizer ring comprises a boss, three projections disposed on the peripheral surface of the boss at the angular interval of 120° and a round elastic ring engaged with and supported by the three projections characterized in that protrusions are disposed at both sides or one side of the three projections and spaced apart from the projections and adjacent thereto for supporting the round elastic ring, the protrusions having the same sectional diameter same as that of the round elastic ring.

A second synchronizer ring comprises a boss, three projections disposed on the peripheral surface of the boss at the angular interval of 120° and a round elastic ring engaged with and supported by the three projections characterized in that stepped protruding pieces are disposed at both sides or one side of the three projections for supporting the round elastic ring, the protrusions being integrally formed with and extending from the projections and having the same sectional diameter as that of the round elastic ring.

A third synchronizer ring comprises a boss, four to six projections disposed on the peripheral surface of the boss at the angular interval of 90° to 60° and a round elastic ring engaged with and supported by the four to six projections.

The above and other objects, features and advantages of the present invention will become more apparent from the following description taken in conjunction with the accompanying drawings.

DESCRIPTION OF THE PREFERRED EMBODIMENT

Figure 5:
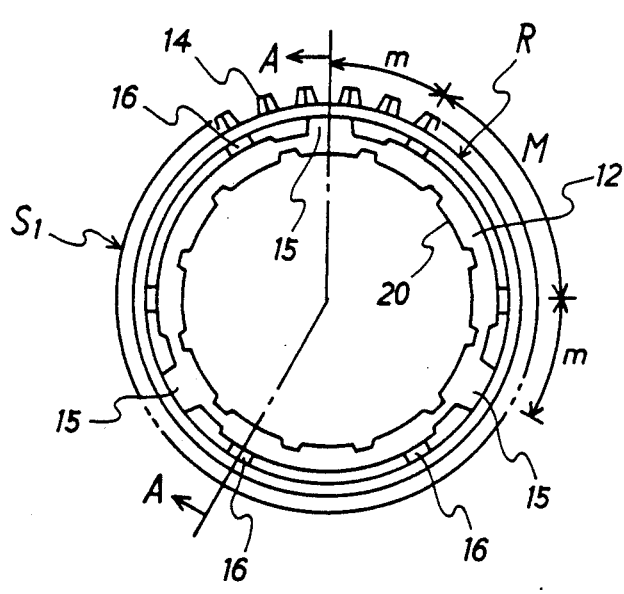
FIG. 5 is a front elevational view of a synchronizer ring according to a first embodiment of the present invention.
Figure 6:
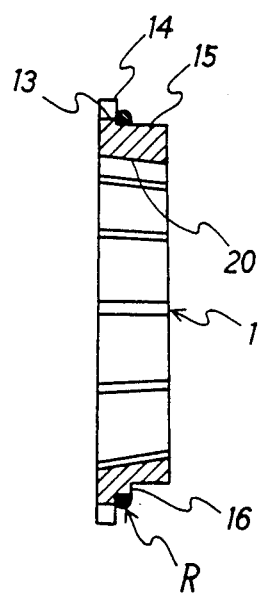
FIG. 6 is a cross sectional view taken along A—A of FIG. 5.
Figure 7:
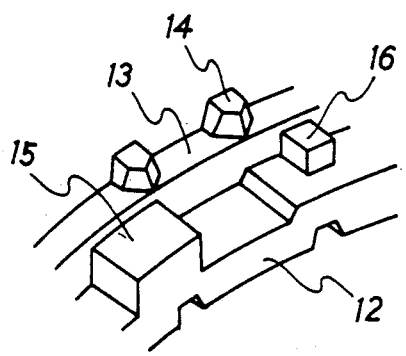
FIG. 7 is a fragmentary perspective view of the synchronizer ring of FIG. 5.

First Embodiment (FIGS. 5 to 7)

A synchronizer ring according to a first embodiment of the present invention will be described with reference to FIGS. 5 to 7.

A synchronizer ring $S_1$ comprises a boss 12 having an inner peripheral surface 20 and an outer peripheral surface, the inner peripheral surface being defined on a declined surface and having a large diameter at the front portion thereof while an outer peripheral surface having projections 13 at the front edge thereof extending to the whole surface thereof, teeth 14 defined on the projections 13, three projections 15, 15, 15 being mounted on and projected from the outer peripheral surface of the boss 12 between the rear end of the boss 12 and the projection 13 at the angular interval of 120°, the height of the projections 15 being substantially the same as that of the projections 13.

However, differing from the prior art synchronizer ring, protrusions 16, 16 have been mounted on the outer peripheral surface of the boss 12 at both sides of the projections 15 and spaced apart from the projections 15. The height of the protrusions 16, 16 is same as that of the projections 15. Each protrusion 16 has a sectional diameter substantially the same as that of the round elastic ring R positioned adjacent to the projection 13.

Two protrusions 16, 16 are positioned between the adjacent two projections 15, 15. The position of the projection 15 in the circumferential direction of the boss 12 is desirable, as shown in FIG. 5, to meet the inequality M>m assuming that the distance between both protrusions 16, 16 is M and the distance between the projection 15 and the protrusion 16 is m. If the protrusion 16 is far spaced apart from the projection 15 to establish the inequality M<m, the round elastic ring R loses its elasticity so that the round elastic ring R does not function sufficiently.

Figure 8:
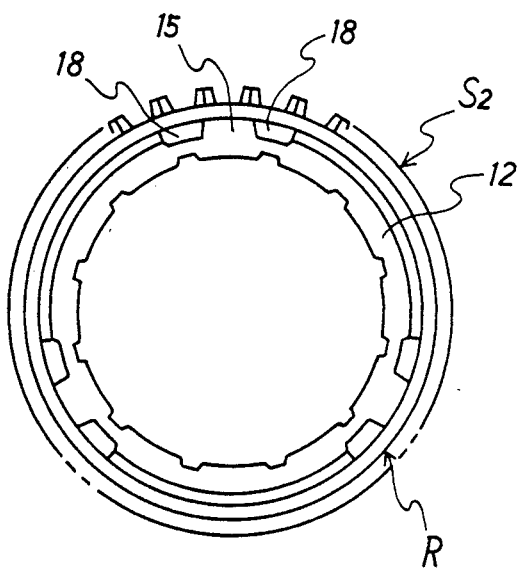
FIG. 8 is a front elevational view of a synchronizer ring according to a second embodiment of the present invention.
Figure 9:
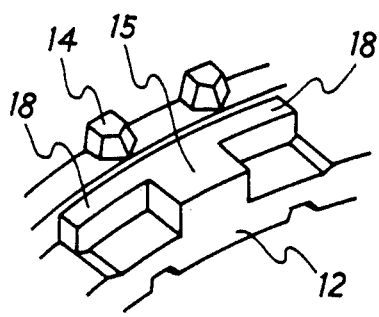
FIG. 9 is a fragmentary perspective view of the synchronizer ring of FIG. 8.

Second Embodiment (FIGS. 8 and 9)

A synchronizer ring according to a second embodiment of the present invention will be described with reference to FIGS. 8 and 9.

The synchronizer ring $S_2$ has projections 15 and stepped protruding pieces 18, 18 integrally formed with and continued from the projection 15 and positioned at both sides of the projection 15.

Figure 10:
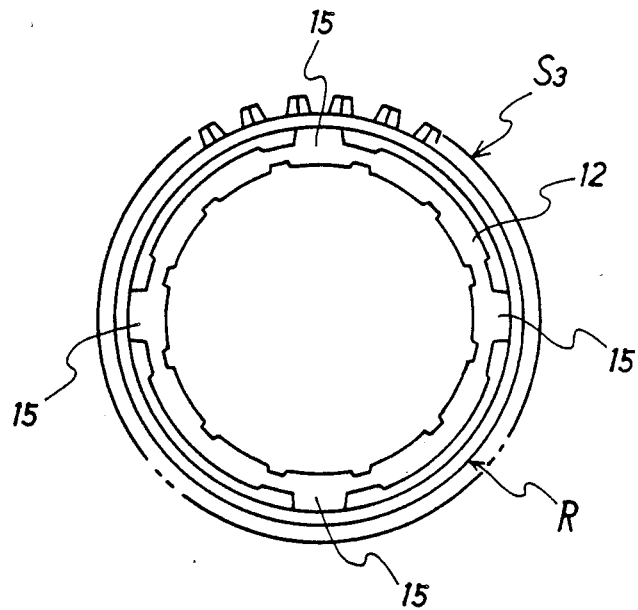
FIG. 10 a front elevational view of a synchronizer ring according to a third embodiment of the present invention.

Third Embodiment (FIG. 10)

A synchronizer ring according to a third embodiment of the present invention will be described with reference to FIG. 10.

The synchronizer ring $S_3$ comprises a boss 12 and four projections 15, 15, 15, 15 mounted on and projected from the outer peripheral surface of the boss 12 and positioned at the angular interval of 90°. The synchronizer ring $S_3$ has the round elastic ring R engaged with and supported by four fulcrums. The distance between each fulcrum of the elastic ring R of the synchronizer ring $S_3$ is less than that of the round elastic ring R of the synchronizer ring $S_2$. Accordingly, the elasticity of the round elastic ring R is increased to achieve the desired function. However, if the elasticity is less than the determined value the protrusions 16 or stepped protrusions 18 are provided between the projections 15 as set forth in the first and second synchronizer rings.

With the arrangements of the first to third synchronizer rings set forth above, inasmuch as each distance between fulcrums to support the round elastic ring becomes shorter an appropriate load can be applied on the round elastic ring even if the synchronizer ring and the round elastic ring have respectively large diameters.

The deflection strength P of the beam is generally expressed as follows.

$$P = 48 \times \frac{EI\delta}{l^2}$$

E: Young's modulus
I: sectional secondary moment
δ: deflection amount
: distance between fulcrums If the same deflection amount is applied to the beam having the same cross section, the deflection strength P is inversely proportional to a triple ratio of so that the variation of the deflection strength P caused by varying the distance between the fulcrums becomes excessively large.

Figure 1:
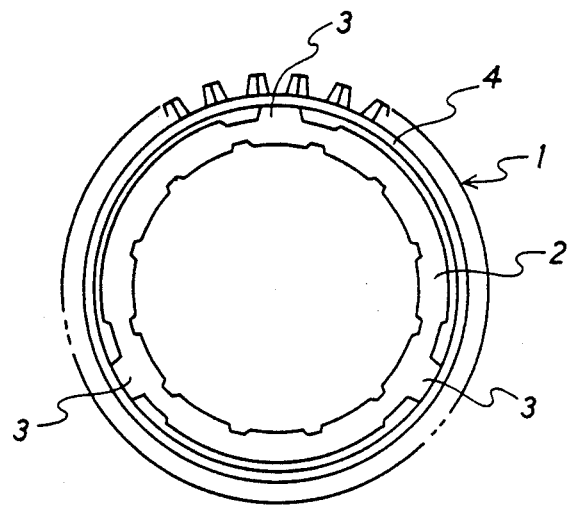
FIG. 1 is a front elevational view of a prior art synchronizer ring.
Figure 2A:
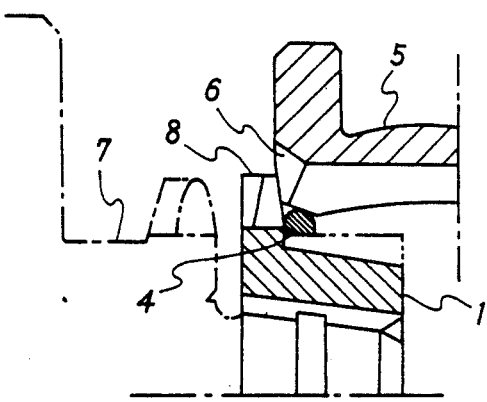
FIGS. 2A, 2B, 2C and 2D are cross sectional views of assistance in explaining prior art speed changing steps.
Figure 2B:
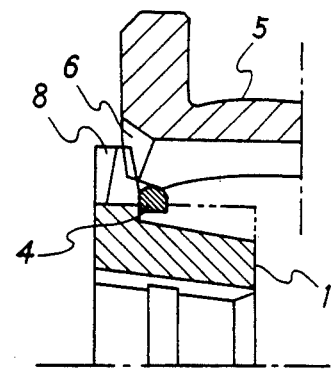
Figure 2C:
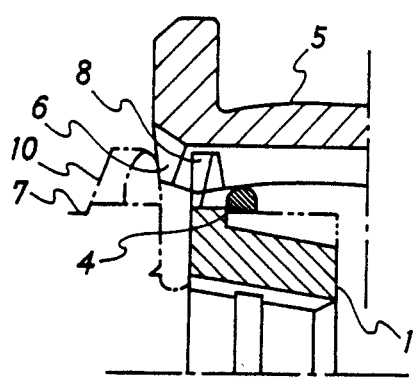
Figure 2D:
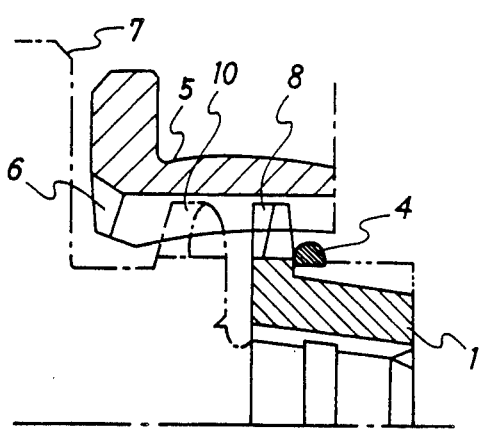
Figure 3:
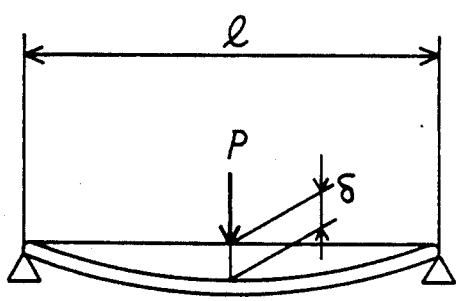
FIG. 3 is a view of assistance in explaining a deflection strength of a beam.
Figure 4:
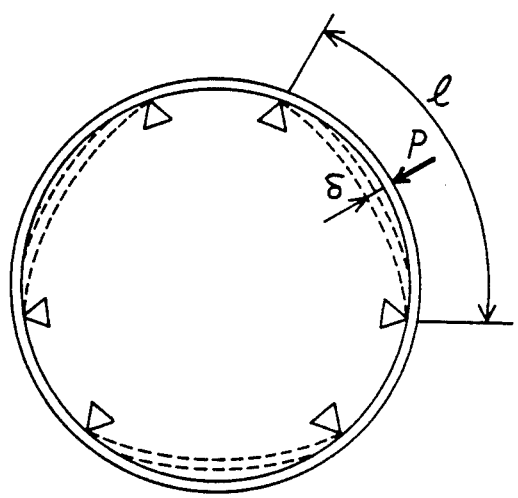
FIG. 4 is a view of assistance in explaining a deflection strength of a round elastic ring.

In accordance with the round elastic ring as illustrated in FIG. 4, the following equation is established:

$$P = k \times \frac{EI\delta}{l^2} \quad (k = \text{constant})$$

Hence, it is very effective to adjust the deflection strength P while the distance is varied.

The first and the second synchronizer rings are provided with protrusions or stepped protrusions which serve to assist the fulcrums without increasing the number of projections so that each equal distance between the fulcrums of the round elastic ring is shortened while the third synchronizer ring has more projections than the first and the second synchronizer rings to thereby shorten each distance between the fulcrums of the round elastic ring.

With the arrangement of the first, second and third synchronizer rings, the necessary deflection strength can be obtained without excessively increasing the cross section of the round elastic rings in the case the large-sized synchronizer ring is employed so that they can be employed in a small sized compact speed change gear of a big truck without increasing the size of the speed change gear whereby the speed change function can be effectively improved.

There does not generate the disadvantage accompanied by the increase of the projections of the third synchronizer ring even if it is employed in the Honda Synchronizer Ring since the Honda Synchronizer does not use a synchronizer key so that there does not generate the cost problem.

Figure 11:
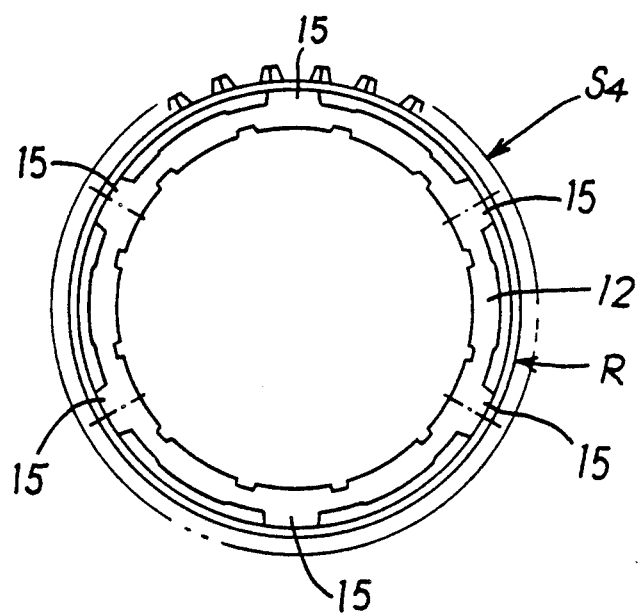
FIG. 11 is an elevational view of a fourth embodiment of the synchronizer ring of the present invention.

FIG. 11 illustrates a fourth embodiment similar to the FIG. 10 embodiment, but having six projections 15 positioned at 60° angular intervals on the boss 12.

Although the invention has been described in its preferred form with a certain degree of particularity, it is to be understood that many variations and changes are possible in the invention without departing from the scope thereof.

What is claimed is:
1. A synchronizer ring comprising:
   a boss;
   three projections disposed on the peripheral surface of the boss at the angular interval of 120°;

a round elastic ring engaged with and supported by the three projections; and at least three protrusions on the peripheral surface of said boss, said protrusions being respectively disposed at both sides or one side of the three projections and spaced away from the projections and adjacent thereto for supporting the round elastic ring, the protrusions having radially outer surfaces which each define an arc having a diameter which is the same as an inner diameter of the round elastic ring.

2. The synchronizer ring according to claim 1, wherein two of said protrusions are associated with each said projection and are respectively equally spaced from said projection in opposite circumferential directions.

3. The synchronizer ring according to claim 2, wherein said protrusions are axially thinner than said projections.

4. The synchronizer ring according to claim 3, wherein said protrusions are circumferentially shorter than said projections.

5. A synchronizer ring comprising:

a boss three projections disposed on the peripheral surface of the boss at the angular interval of 120°;

a circular elastic ring engaged with and supported by the three projections, said circular elastic ring having a radially outer peripheral edge which is circular in shape, which extends circumferentially for 360°, and which lies, in its entirety, in a circular cylinder; and at least three protrusions on the peripheral surface of said boss, said protrusions being respectively disposed at both sides or one side of the three projections for supporting the circular elastic ring, the protrusions being integrally formed with and extending circumferentially from the projections, said protrusions being axially thinner than said projections and having radially outer surfaces which define an arc having a diameter which each is the same as an inner diameter of the circular elastic ring.

6. The synchronizer ring according to claim 5, wherein two of said protrusions are associated with each said projection, each said integrally formed projection and protrusions having substantially a T shape as viewed radially.

7. The synchronizer ring according to claim 6, wherein said protrusions and said projections have approximately equal circumferential lengths.

* * * * *